(12) United States Patent
Mahadeswaraswamy et al.

(10) Patent No.: US 11,373,396 B2
(45) Date of Patent: Jun. 28, 2022

(54) SYSTEMS AND METHODS FOR IMPROVED FEATURE EXTRACTION USING POLARIZATION INFORMATION

(71) Applicant: Google LLC, Mountain View, CA (US)

(72) Inventors: Chetan Mahadeswaraswamy, San Francisco, CA (US); Jingjin Xie, Piscataway, NJ (US); Christopher James Ducote, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/624,477

(22) PCT Filed: Nov. 6, 2017

(86) PCT No.: PCT/US2017/060108
§ 371 (c)(1),
(2) Date: Dec. 19, 2019

(87) PCT Pub. No.: WO2019/089049
PCT Pub. Date: May 9, 2019

(65) Prior Publication Data
US 2020/0311418 A1 Oct. 1, 2020

(51) Int. Cl.
*G06K 9/00* (2022.01)
*G06V 20/00* (2022.01)
(Continued)

(52) U.S. Cl.
CPC .......... *G06V 20/00* (2022.01); *G06K 9/6256* (2013.01); *G06T 7/40* (2013.01); *G06T 7/50* (2017.01);
(Continued)

(58) Field of Classification Search
CPC .... G06K 9/00624; G06K 9/46; G06K 9/6256; G06T 7/50; G06T 7/40; G06T 2207/10028; G06T 2207/20081
See application file for complete search history.

(56) References Cited

U.S. PATENT DOCUMENTS

| 8,264,536 B2 * | 9/2012 | McEldowney ...... G06K 9/2036 348/135 |
| 9,123,116 B2 | 9/2015 | Debevec et al. |

(Continued)

FOREIGN PATENT DOCUMENTS

EP 3086282 10/2016

OTHER PUBLICATIONS

Atkinson et al, "Multi-View Surface Reconstruction using Polarization", Conference on Computer Vision, Beijing, China, Oct. 17-20, 2005, 8 pages.
(Continued)

*Primary Examiner* — Gregory M Desire
(74) *Attorney, Agent, or Firm* — Dority & Manning, P.A.

(57) ABSTRACT

Systems and methods for extracting a feature in an image are provided. In one example embodiment, a computer-implemented method includes obtaining image data representing a scene, wherein the image data includes a plurality of images of the scene, each image associated with a different polarization angle. The method includes determining attribute information based at least in part on the plurality of images. The method includes determining one or more features in the image data based at least in part on the attribute information.

13 Claims, 14 Drawing Sheets

(51) Int. Cl.
*G06T 7/50* (2017.01)
*G06K 9/62* (2022.01)
*G06T 7/40* (2017.01)
*G06V 10/40* (2022.01)

(52) U.S. Cl.
CPC .... *G06V 10/40* (2022.01); *G06T 2207/10028* (2013.01); *G06T 2207/20081* (2013.01)

(56) References Cited

U.S. PATENT DOCUMENTS

| | | | |
|---|---|---|---|
| 9,240,049 | B2 | 1/2016 | Ciurea et al. |
| 10,260,866 | B2* | 4/2019 | Kadambi ............... G06T 7/507 |
| 10,366,303 | B2* | 7/2019 | Kondo ............... G06K 9/00255 |
| 10,557,705 | B2* | 2/2020 | Kadambi ............... G01B 11/24 |
| 2016/0261844 | A1 | 9/2016 | Kadambi et al. |
| 2017/0188012 | A1 | 6/2017 | Takagi |
| 2020/0088579 | A1* | 3/2020 | Balas ............... G01J 3/0205 |
| 2021/0010927 | A1* | 1/2021 | Shao ............... G02B 21/0036 |

OTHER PUBLICATIONS

Atkinson et al, "Shape from Diffuse Polarisation", British Machine Vision Conference, Sep. 7-9, 2004, Kingston University, London, 10 pages.

Conner et al, "Improving Infrared Vehicle Detection with Polarisation", Intelligent Signal Processing Conference, Dec. 2013, 6 pages.

Cui et al, "Polarimetric Multi-View Stereo", Conference on Computer Vision and Pattern Recognition, Honolulu, Hawaii, Jul. 21-26, 2017, 11 pages.

International Search Report for PCT/US2017/060108 dated Jul. 30, 2018, 4 pages.

Iqbal, "Polarization Stereoscopic Imaging Prototype", University of Bourgogne, PhD thesis, 2011, 189 pages.

Kadambi et al, "Depth Sensing Using Geometrically Constrained Polarization Normals", International Journal of Computer Vision, Jun. 22, 2017, 18 pages.

Kadambi et al, "Polarized 3D: High-Quality Depth Sensing with Polarization Cues", Conference on Computer Vision, Santiago, Chile, Dec. 13-16, 2015, 9 pages.

Kaller et al, "Depth Map Improvement by Combining Passive and Active Scanning Methods", Radioengineering Journal, vol. 25, No. 3, Sep. 2016, 12 pages.

Rantoson et al, "3D Reconstruction by Polarimetric Imaging Method Based on Perspective Model," University of Bourgogne, 12 pages.

Subramaniam et al, "Natural Material Segmentation and Classification Using Polarisation", 2011, 8 pages.

Zhang et al, "Estimating Surface Characteristics and Extracting Features from Polarisation", Structural, Syntactic and Statistical Pattern Recognition: Joint IAPR International Workshop, Hiroshima, Japan, Nov. 7-9, 2012, 9 pages.

\* cited by examiner

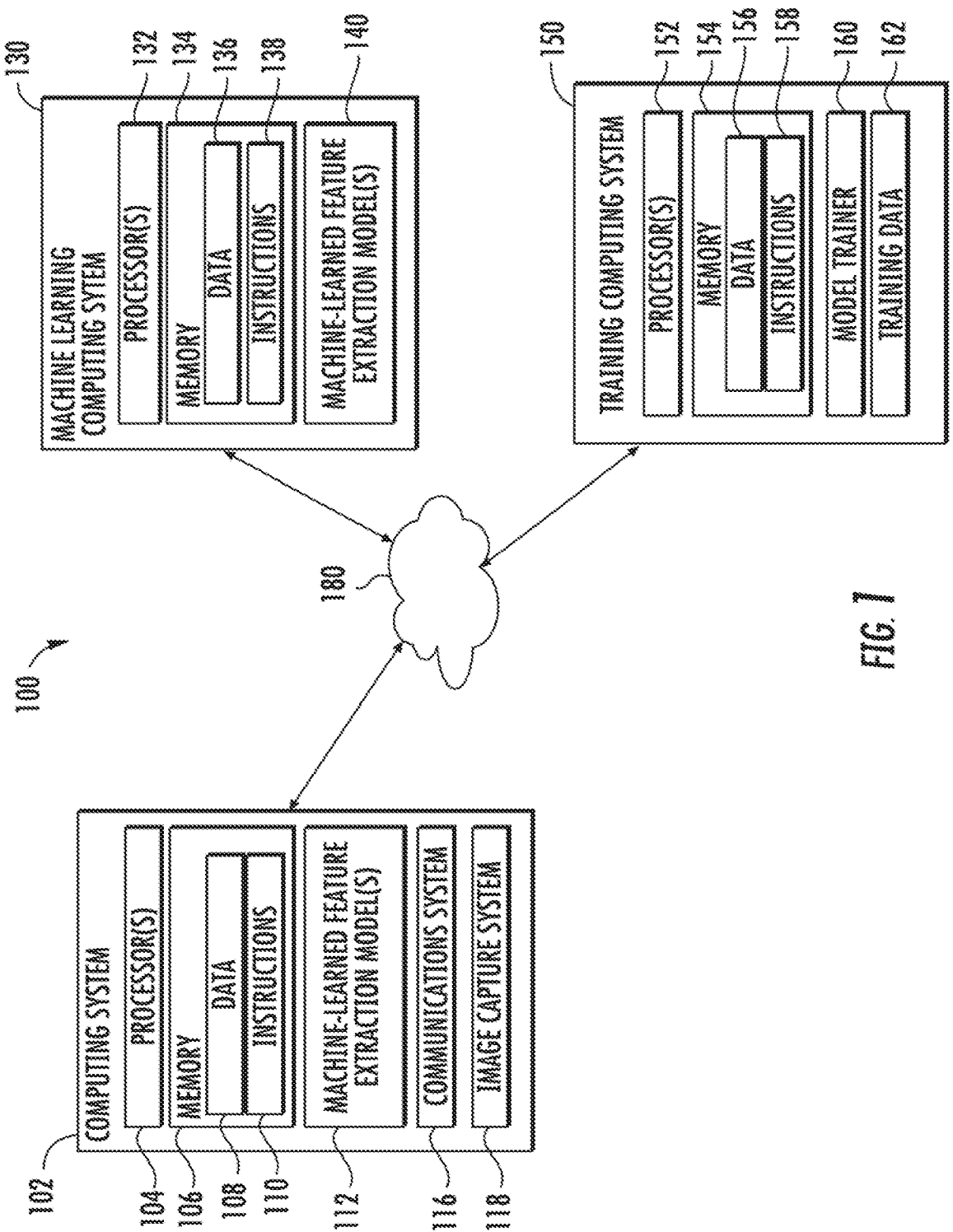

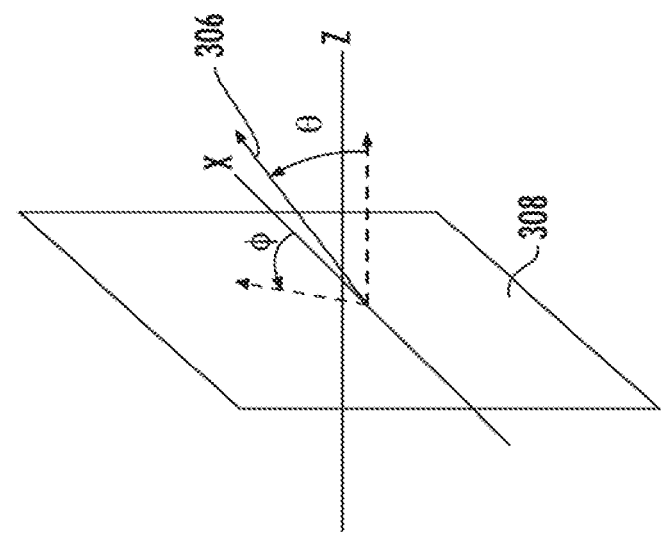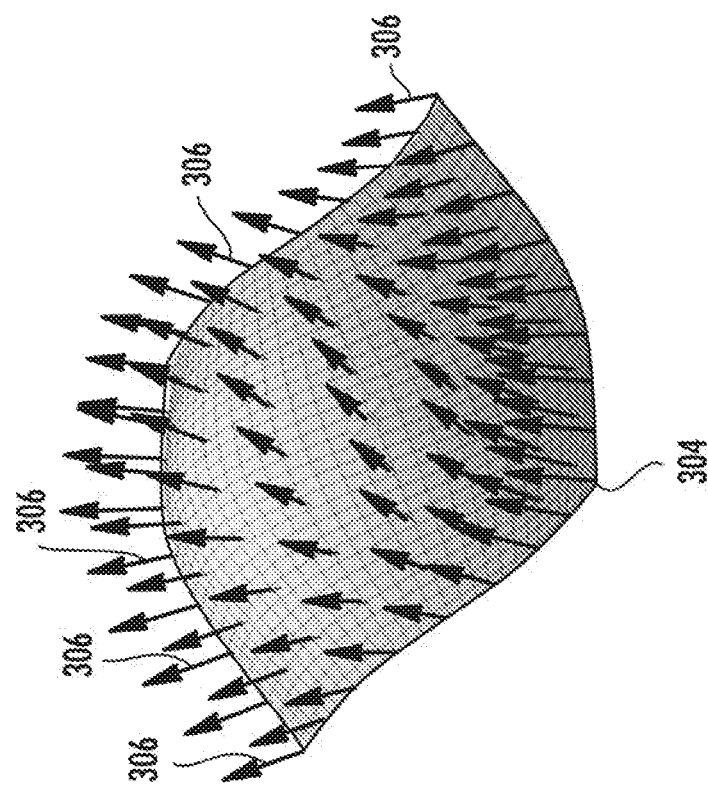
FIG. 3

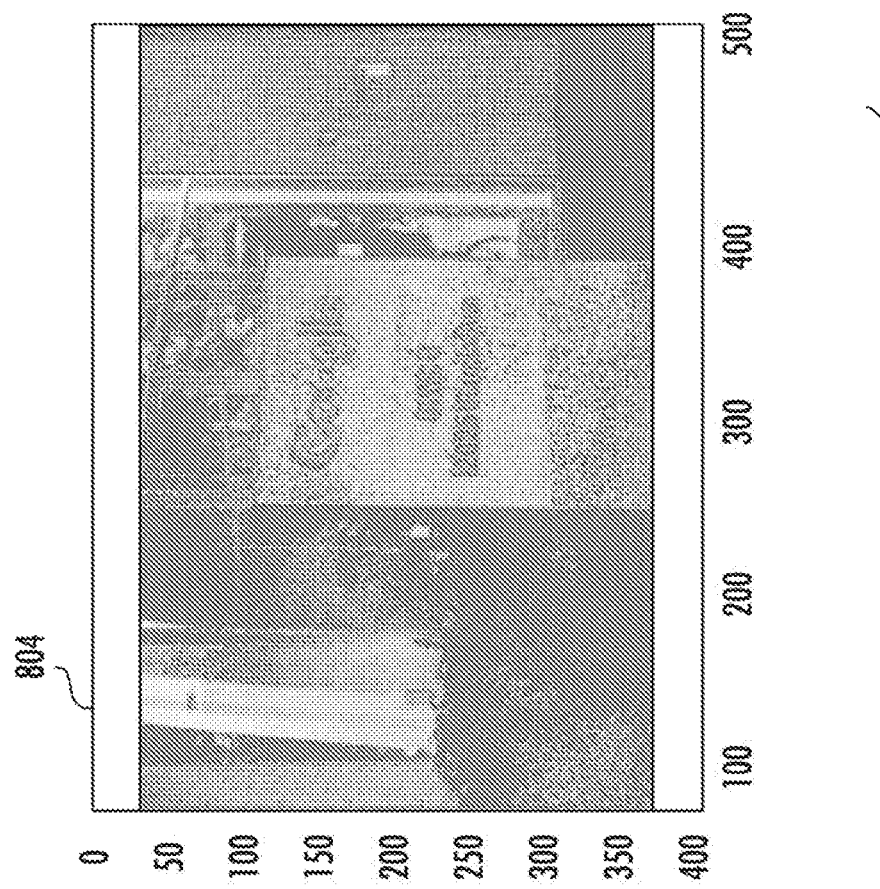
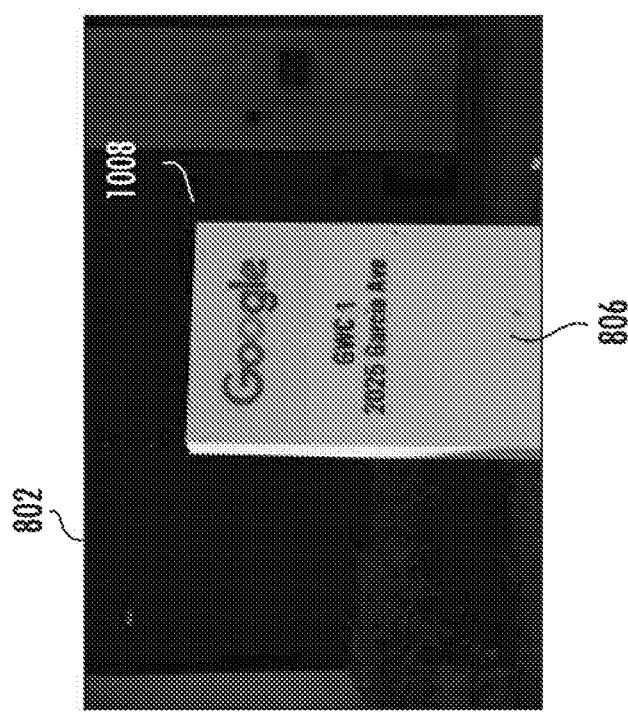
FIG. 8

SYSTEMS AND METHODS FOR IMPROVED FEATURE EXTRACTION USING POLARIZATION INFORMATION

PRIORITY CLAIM

This application is based upon and claims the right of priority under 35 U.S.C. § 371 to International Application No. PCT/US2017/040798 filed on Jul. 6, 2017, which is incorporated by reference herein.

FIELD

The present disclosure relates generally to improved feature extraction using polarization information.

BACKGROUND

Visible or multispectral cameras, and LIDAR, are some approaches that are used to generate image data representing a scene. However, performing object identification or classification using image data generated by these approaches can be time-consuming and resource-intensive. There is a need for additional approaches to generating image data that can improve an accuracy and efficiency of performing object-identification or classification.

SUMMARY

Aspects and advantages of the present disclosure will be set forth in part in the following description, or may be learned from the description, or may be learned through practice of the embodiments.

One example aspect of the present disclosure is directed to a computer-implemented method to extract a feature in an image. The method includes obtaining, by one or more computing devices, image data representing a scene. The image data includes a plurality of images of the scene, each image associated with a different polarization angle. The method includes determining, by the one or more computing devices, attribute information based at least in part on the plurality of images. The method includes determining, by the one or more computing devices, one or more features in the image data based at least in part on the attribute information.

Another example aspect of the present disclosure is directed to a computer-implemented method to perform machine learning. The method includes obtaining, by a computing system, a plurality of training images having known features. The method includes inputting, by the computing system, each of the plurality of training images into a machine learned model. The method includes obtaining, by the computing system, in response to inputting the plurality of training images, an output of the machine learned model that includes predicted features for each of the plurality of training images. The method includes determining, by the computing system, a loss value that describes a difference between the respective predicted features and the respective known features for each of the plurality of training images. The method includes adjusting, by the computing system, one or more parameters of the machine learned model to reduce the loss value.

Another example aspect of the present disclosure is directed to a computer system. The computer system includes one or more image capture devices, one or more processors, and one or more non-transitory computer-readable media that, when executed by the one or more processors, cause the computer system to perform operations. The operations include obtaining image data representing a scene. The image data includes a plurality of images of the scene, each image associated with a different polarization angle. The operations include determining attribute information based at least in part on the plurality of images. The operations include determining one or more features in the image data based at least in part on the attribute information.

Another example aspect of the present disclosure is directed to a computer system. The computer system includes one or more image capture devices, one or more processors, and one or more non-transitory computer-readable media that, when executed by the one or more processors, cause the computer system to perform operations. The operations include inputting, by the computing system, each of the plurality of training images into a machine learned model. The operations include obtaining in response to inputting the plurality of training images, an output of the machine learned model that includes predicted features for each of the plurality of training images. The operations include determining a loss value that describes a difference between the respective predicted features and the respective known features for each of the plurality of training images. The operations include adjusting one or more parameters of the machine learned model to reduce the loss value.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which:

FIG. 1 depicts a block diagram of an example system according to example embodiments of the present disclosure;

FIG. 3 depicts example attribute information, according to example aspects of the present disclosure;

FIG. 7 depicts an example of extracting one or more features from an obfuscated region in image data, according to example aspects of the present disclosure;

Figure 2A:
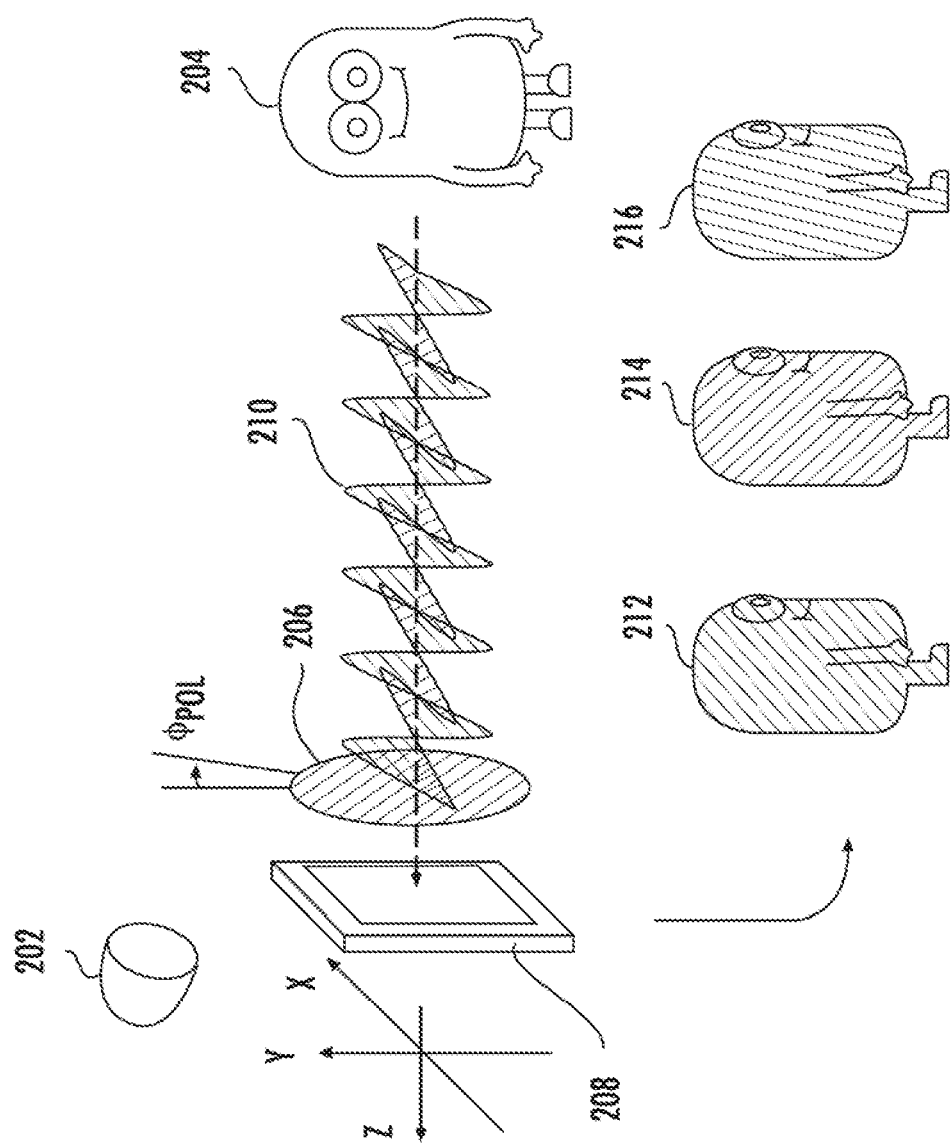
FIG. 2A depicts an example system that can generate image data, according to example aspects of the present disclosure.

Reference numerals that are repeated across plural figures are intended to identify the same components or features in various implementations.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to extracting one or more features of a scene based on polarization information in image data representing the scene. Image data that represents a scene can be generated by, for example, detecting variable attenuation of electromagnetic radiation (e.g., light waves) that pass through or reflect off objects in the scene, and translating this information into pixel data. An electromagnetic wave such as light consists of a coupled oscillating electric field and magnetic field which are always perpendicular, and a "polarization" of the electromagnetic wave refers to the direction of the electric field. The image data can include polarization information indicative of a polarization of the detected electromagnetic waves used to generate the image data.

Aspects of the present disclosure can provide a system (e.g., a computing system), and methods for controlling the same, to extract one or more features based on polarization information in image data. Aspects of the present disclosure can provide systems and methods that improve feature extraction by using polarization information in image data to, for example, enhance details, identify/differentiate materials or textures, reveal obfuscated regions, aid segmentation, etc. Aspects of the present disclosure can also provide systems and methods for using a machine learned feature extractor model to facilitate extracting one or more features in image data.

In some embodiments, the computing system can include one or more processors, and one or more tangible, non-transitory media that collectively store image data representing a scene. The computing system can process the image data to extract one or more features of the scene, such as, for instance, one or more objects of interest and/or one or more properties corresponding to each object of interest. For example, the computing system can extract features indicative of one or more objects of interest such as, but not limited to, pedestrians, vehicles, signs, buildings, landmarks, etc. As another example, the computing system can extract features indicative of one or more properties of one or more objects, such as, but not limited to, position, depth, material, texture, refractive index, etc.

In some embodiments, the computing system can include a communications system that allows the computing system to communicate with one or more other computing systems (e.g., image database computing system, image capture computing system, etc.). The one or more other computing systems can be remote from the computing system. For example, the computing system can communicate with an image database computing system that stores image data, to obtain the image data. As another example, the computing system can communicate with an image capture computing system that generates image data, to obtain the image data.

In some embodiments, the computing system can include an image capture system that allows the computing system to generate image data. The image capture system can include one or more image capture devices (e.g., cameras) and one or more polarizing filters. The computing system can control the one or more polarizing filters to adjust an angle of polarization (e.g., polarizing angle) of each polarizing filter. The computing system can control the one or more polarizing filters to filter light from a scene (e.g., light that is passed through or reflected by an object in the scene) and output polarized light. Each of the one or more polarizing filters can output polarized light that corresponds to its angle of polarization. For example, a polarizing filter adjusted to an angle of 30 degrees can output light that is polarized at 30 degrees. The computing system can control the one or more polarizing filters to provide the polarized light to the one or more image capture devices. The one or more image capture devices can generate a plurality of polarized images based on the polarized light. Each of the plurality of polarized images can represent the same scene, but can correspond to a respective polarizing angle. For example, an image capture device can generate a first polarized image of a scene by detecting polarized light output by a polarizing filter adjusted to a first polarizing angle, a second polarized image of the scene by detecting polarized light output by a polarizing filter adjusted to a second polarizing angle, a third polarized image of the scene by detecting polarized light output by a polarizing filter adjusted to a third polarizing angle, etc. The computing system can generate image data that includes the plurality of polarized images of the scene.

As an example, if the image capture system includes a single camera and a single polarizing filter, then the image capture system can receive a first set of light waves from a scene at a first time, polarize the first set of light waves at a first polarizing angle, and generate a first polarized image corresponding to the first polarizing angle. Continuing the same example, the image capture system can receive a second set of light waves (or third, fourth, fifth, etc.) from the scene at a second time (or third, fourth, fifth, etc.), polarize the light waves at a second polarizing angle (or third, fourth, fifth, etc.), and generate a second polarized image (or third, fourth, fifth, etc.) corresponding to the polarizing angle.

As another example, if the image capture system includes two or more cameras and two or more polarizing filters, then the image capture system can set each polarizing filter to a respective polarizing angle, and simultaneously generate two or more polarized images corresponding to the two or more respective polarizing angles. In this example, the computing system can use one or more splitters to split light from a scene to provide the light to each of the two or more polarizing filters. In this way, the computing system can generate image data that includes a plurality of polarized images captured at a plurality of respective polarizing angles, at one given time.

In some embodiments, the computing system can obtain image data that includes at least three polarized images corresponding to three different polarizing angles. The computing system can use the at least three polarized images to determine one or more attributes (e.g., attribute information) of one or more pixels in the image data. The one or more attributes can include, for instance, a degree of polarization, a zenith angle of a surface normal, and an azimuth angle of a surface normal. The computing system can determine the degree of polarization ρ, zenith angle θ, and azimuth angle φ, for each pixel in the image data by based on the relationships represented by the equations:

$$\rho = \frac{I_{max} - I_{min}}{I_{max} + I_{min}} \quad (1)$$

$$\rho = \frac{\left(n - \frac{1}{n}\right)^2 \sin^2\theta}{2 + 2n^2 - \left(n + \frac{1}{n}\right)^2 \sin^2\theta + 4\cos\theta\sqrt{n^2 - \sin^2\theta}} \quad (2)$$

$$I(\phi_{pol}) = \frac{I_{max} + I_{min}}{2} + \frac{I_{max} - I_{min}}{2} \cos(2(\phi_{pol} - \phi)) \quad (3)$$

where n is a refractive index, $\varphi_{pol}$ is a polarizing angle, and I ($\varphi_{pol}$) is an intensity corresponding to the polarizing angle $\varphi_{pol}$.

For example, the computing system can obtain image data that includes a first, second, and third polarized image corresponding to a first, second, and third polarizing angle, respectively, at time t=0. The computing system can calculate an intensity for a pixel in each of the first, second, and third images to determine a Transmitted Radiance Sinusoid (TRS) curve that fits the image data. The Transmitted Radiance Sinusoid curve can be used to determine a maximum intensity value $I_{max}$ and a minimum intensity value $I_{min}$ for the image data. The computing system can determine a degree of polarization, a zenith angle of a surface normal, and an azimuth angle of a surface normal for each pixel in the image data, by using the maximum intensity value $I_{max}$ and minimum intensity value $I_{min}$ in conjunction with equations (1), (2), and (3). In this example, the refractive index n corresponds to the medium (e.g., air) through which light from a scene travels to reach the image capture device and is a known variable.

In another example, the computing system can obtain image data that includes four or more polarized images that correspond to four or more polarizing angles, respectively, at time t=0. By using a fourth image corresponding to a fourth polarizing angle, and calculating an intensity of a pixel in each of the first, second, third, and fourth images, an unknown refractive index n can be determined alongside the degree of polarization ρ, a zenith angle θ of a surface normal, and an azimuth angle φ of a surface normal. Additionally, or alternatively, by four or more polarized images that correspond to four or more polarizing angles, respectively, a precision of a calculated Transmitted Radiance Sinusoid curve and determined attribute information can be improved.

According to example aspects of the present disclosure, the computing system can extract one or more features in image data based on one or more attributes of one or more pixels (e.g., attribute information) in the image data. The one or more features can be identified using one or more feature extraction techniques.

In some embodiments, the computing system can analyze attribute information together with sparse point cloud data or other depth data representing the same scene as the image data, to extract enhanced depth information in the image data. For example, when the computing system determines an azimuth angle of a surface normal of one or more pixels in image data, based on a Transmitted Radiance Sinusoid curve that fits the image data, the determined azimuth angles for the one or more pixels can include a 180 degree (+pi radians) ambiguity. The computing system can determine surface normal information corresponding to the one or more pixels based on the sparse point cloud data, and disambiguate the attribute information based on the surface normal information. The computing system can obtain the sparse point cloud data from a remote computing system and/or the computing system can include a sparse point cloud system that allows the computing system to generate the sparse point cloud data. The computing system can combine the disambiguated attribute information with the surface normal information to obtain enhanced depth information corresponding to the one or more pixels in the image data. The computing system can extract features in the image data based on the enhanced depth information. For example, the computing system can extract features indicative of a position and depth corresponding to one or more objects of interest in image data.

In some embodiments, the computing system can analyze attribute information to aid segmentation of image data representing a scene. For example, the computing system can analyze a degree of polarization, azimuth angle, and zenith angle corresponding to each pixel in the image data. By comparing the attribute information for a pixel with corresponding attribute information for one or more other pixels in the image data, the computing system can identify a boundary or edge corresponding to one or more objects of interest in the scene. The computing system can extract features in the image data based on the identified boundary or edge. For example, the computing system can extract features indicative of segmentation information for one or more objects of interest in the scene, so that the computing system can segment the one or more objects with respect to one or more other objects in the scene and/or a background in the scene.

In some embodiments, the computing system can analyze attribute information to extract feature information in one or more obfuscated regions in image data representing a scene. The one or more obfuscated regions can correspond to one or more physical regions in the scene. The image data can include one or more obfuscated regions if the computing system is not able to extract feature information of the corresponding region in the scene with intensity information of the obfuscated region. For example, if an image capture device generates an image with an insufficient amount of light from a physical region in a scene, then the information in the light can be translated to pixel data that includes insufficient intensity information for a computing system to extract one or more features of the physical region of the scene from the image. The computing system can analyze a degree of polarization, azimuth angle, and zenith angle determined for each pixel in the image data to reveal the obfuscated regions. For example, by comparing attribute information for a pixel with corresponding attribute information for one or more other pixels in the image data, the computing system can identify a boundary or edge corresponding to one or more objects of interest in the scene, even in the obfuscated regions in the image data. The computing system can extract features in the image data based on the identified boundary or edge. For example, the computing system can extract features indicative of segmentation information for one or more objects of interest in the scene to segment the one or more objects with respect to one or more other objects in the scene and/or a background in the scene.

In some embodiments, the computing system can analyze attribute information to identify/differentiate materials or textures in image data representing a scene. When light passes through some objects or is reflected by some objects, the polarization of the light can be affected. For example, an object composed of a material that exhibits birefringence, dichroism, or optical activity can affect the polarization of light that passes through the object. As another example, an object with a smooth texture can affect the polarization of light that is reflected by the object in a first way, and an object with a rough texture can affect the polarization of light that is reflected by the object in a second way. As yet another example, light that is reflected by a glass window can exhibit a high degree of polarization with respect to light that is reflected by an opaque wall. The computing system can analyze a degree of polarization, azimuth angle, and zenith angle determined for each pixel in the image data to identify/differentiate materials or textures in the scene. By comparing attribute information for a pixel with corresponding attribute information for one or more other pixels in the image data, the computing system can identify one or more materials or textures in the scene. By identifying one or more materials or textures in the scene, the computing system can differentiate regions or objects in the scene that are associated with different materials or textures.

As an example, the computing system can integrate attribute information to identify one or more textures in a scene. If a slope of the integrated attribute information is a substantially smooth curve, then the computing system can extract features indicative of a smooth texture in one or more regions associated with the substantially smooth curve. Otherwise, if the integrated attribute information is not a substantially smooth curve, then the computing system can extract features indicative of a rough texture in one or more regions associated with a not substantially smooth curve.

In some embodiments, the computing system can analyze attribute information to extract enhanced depth information in image data representing a scene, based on one or more materials or textures in the scene, and based on the attribute information. The computing system can analyze a degree of polarization, azimuth angle, and zenith angle determined for each pixel in image data corresponding to an object to identify a material or texture corresponding to the object to better interpolate a path of light passing through or reflected by the object.

As an example, when light is reflected by tree (first object) and then reflected by a glass window (second object) before being detected by an image capture device to generate an image, the tree can appear to be positioned at or behind the glass window in the image. By identifying that the second object is glass and/or has a smoot texture, the computing system can determine that the first object is a reflection of a tree elsewhere in the scene.

According to example aspects of the present disclosure, the computing system can input image data representing a scene into a machine learned feature extraction model. In particular, the image data can be provided as input to a neural network of a machine learned feature extraction model. The machine learned feature extraction model can process the image data and output a prediction of one or more objects of interest and/or one or more properties of one or more objects of interest. In some implementations, the machine learned model can provide as an output a confidence score indicative of a determined likelihood that a predicted object/property is correct.

In some embodiments, the machine learned feature extraction model can include one or more neural networks (e.g., deep neural networks), support vector machines, decision trees, ensemble models, k-nearest neighbors models, Bayesian networks, or other types of models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks.

In some embodiments, when training the machine learned feature extraction model to determine object data characterizing one or more objects in a scene, a feature extraction training dataset can include a large number of previously obtained input image data and corresponding labels that describe corresponding object data for objects detected within such input image data.

In some embodiments, the feature extraction training dataset includes a first portion of data corresponding to input image data originating from one or more image capture systems or image capture computing systems. The input image data can include polarization information of light that is captured to generate a polarized image representing a scene. The feature extraction training dataset can further include a second portion of data corresponding to labels identifying corresponding object data for objects detected within each portion of input image data. The labels included within the second portion of data within the feature extraction training dataset can be manually annotated, automatically annotated, or annotated using a combination of automatic labeling and manual labeling.

In some embodiments, to train the machine learned feature extraction model, a training computing system can input a first portion of a set of ground-truth data (e.g., the first portion of the feature extraction training dataset corresponding to input image data) into the machine-learned feature extraction model to be trained. In response to receipt of such first portion, the machine-learned feature extraction model outputs object data for objects detected within the input image data. This output of the machine-learned feature extraction model predicts the remainder of the set of ground-truth data (e.g., the second portion of the detector training dataset). After such prediction, the training computing system can apply or otherwise determine a loss function that compares the object data output by the machine-learned feature extraction model to the remainder of the ground-truth data which the feature extraction model attempted to predict. The training computing system then can backpropagate the loss function through the feature extraction model to train the feature extraction model (e.g., by modifying one or more weights associated with the feature extraction model). This process of inputting ground-truth data, determining a loss function and backpropagating the loss function through the detector model can be repeated numerous times as part of training the feature extraction model. For example, the process can be repeated for each of numerous sets of ground-truth data provided within the feature extraction training dataset.

The systems and methods described herein may provide a number of technical effects and benefits. By obtaining image data including polarization information, a computing system according to aspects of the present disclosure can provide a technical effect and benefit of improved feature extraction by using the polarization information to enhance details, identify/differentiate materials or textures, reveal obfuscated regions, aid segmentation, etc. Additionally, by using polarization information in addition to other information (e.g., sparse point cloud data), a computing system according to aspects of the present disclosure can provide a technical effect and benefit of more accurately identifying and extracting features in the image data, as well as improving a reliability of the extracted features.

The systems and methods described herein may also provide resulting improvements to computing technology tasked with feature extraction. For example, the systems and methods described herein may provide improvements in the speed and accuracy of object detection and classification, resulting in improved operational speed and reduced processing requirements for computing systems.

With reference now to the FIGS., example embodiments of the present disclosure will be discussed in further detail.

FIG. 1 depicts a block diagram of an example system 100 according to example embodiments of the present disclosure. The system 100 can include, for example, one or more of a computing system 102, machine learning computing system 130, and training computing system 150, which can be respectively configured or operable to perform aspects of the present disclosure, including creation and/or use of a feature extraction model. Computing system 102, machine learning computing system 130, and training computing system 150 can be communicatively connected over a network 180. Although only one computing system 102 is shown, any number of computing systems 102 can be connected to the machine learning computing system 130 and/or training computing system 150 over the network 180.

More particularly, the computing system 102 can include one or more computing devices, such as but not limited to a desktop computing device, a laptop computing device, a tablet computing device, a mobile computing device (e.g., a smartphone computing device), a computing device of a vehicle (e.g., an in-vehicle communications system, an in-vehicle entertainment system, an in-vehicle navigation system), or a wearable apparatus that includes a computing device (e.g., a watch having a computing device, glasses having a computing device, a virtual or augmented reality computing device). Additional and/or alternative computing devices can be provided.

The computing system 102 can include one or more processors 104 and a memory 106. The one or more processors 104 can be any suitable processing device (e.g., a processor core, a microprocessor, an ASIC, a FPGA, a GPU, a controller, a microcontroller, etc.) and can be one processor or a plurality of processors that are operatively connected. The memory 106 can include one or more non-transitory computer-readable storage mediums, such as RAM, ROM, EEPROM, EPROM, flash memory devices, magnetic disks, etc., and combinations thereof. The memory 106 can store data 108 and instructions 110 which are executed by the one or more processors 104 to cause the computing system 102 to perform operations.

The computing system 102 can store or otherwise include a feature extraction model 112. Feature extraction model 112 can be or can otherwise include a machine-learned feature extraction model. For example, a machine-learned feature extraction model can include one or more neural networks (e.g., deep neural networks), support vector machines, decision trees, ensemble models, k-nearest neighbors models, Bayesian networks, or other types of multi-layer models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks. In some implementations, the computing system 102 can additionally or alternatively access a feature extraction model that is stored in a remote location from the computing system 102 (e.g., at a remote server location hosting a feature extractor), such as machine learning computing system 130.

Computing system 102 can further include a communications system 116 that allows the computing system 102 to communicate with one or more other computing systems (e.g., remote computing systems). In some implementations, the communications system 116 can allow communication among one or more system(s) of the computing system 102. The communications system 116 can include any suitable sub-systems for interfacing with one or more network(s), including, for example, transmitters, receivers, ports, controllers, antennas, and/or other suitable sub-systems that can help facilitate communication.

Computing system 102 can further include an image capture system 118 that allows the computing system to generate image data representing a scene. The image capture system 118 can include one or more image capture devices (e.g., cameras) and one or more polarizing filters.

The machine learning computing system 130 can include one or more processors 132 and a memory 134. The one or more processors 132 can be any suitable processing device (e.g., a processor core, a microprocessor, an ASIC, a FPGA, a GPU, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the one or more processors 132 to cause the machine learning computing system 130 to perform operations.

In some implementations, the machine learning computing system 130 includes or is otherwise implemented by one or more server computing devices. In instances in which the machine learning computing system 130 includes plural server computing devices, such server computing devices can operate according to sequential computing architectures, parallel computing architectures, or some combination thereof.

The machine learning computing system 130 can store or otherwise include one or more machine-learned models, including machine-learned feature extraction model 140. For example, the machine-learned feature extraction model 140 can be or can otherwise include various machine-learned models such as neural networks (e.g., deep recurrent neural networks) or other multi-layer non-linear models, regression-based models or the like. The machine learning computing system 130 can train the machine-learned feature extraction model 140 via interaction with the training computing system 150 that is communicatively coupled over the network 180. The training computing system 150 can be separate from the machine learning computing system 130 or can be a portion of the machine learning computing system 130. Once the machine-learned feature extraction model 140 is trained, it can be provided to or otherwise accessed by computing system 102.

The training computing system 150 can include one or more processors 152 and a memory 154. The one or more processors 152 can be any suitable processing device (e.g., a processor core, a microprocessor, an ASIC, a FPGA, a GPU, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the one or more processors 152 to cause the training computing system 150 to perform operations. In some implementations, the training computing system 150 includes or is otherwise implemented by one or more server computing devices.

The training computing system 150 can include a model trainer 160 that trains the machine-learned feature extraction model 140. More particularly, the model trainer 160 can train feature extraction model 140 to receive one or more input image data and, in response to receipt of the one or more input image data, provide as an output a prediction of one or more objects of interest in the scene and/or one or more properties of the one or more objects of interest.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

Model trainer 160 can train the machine-learned feature extraction model 140 using training data 162. The training computing system 150 can implement model training using various training or learning techniques, such as, for example, backpropagation of one or more loss functions. Adapting weights within a machine-learned model via backpropagation can then be repeated in accordance with one or more algorithms including but not limited to Gradient Descent, Stochastic Gradient Descent (SGD), Adaptive Gradient Descent (AdaGrad) and/or Adaptive Moment Estimation (ADAM) algorithms. The model trainer 160 can perform a number of generalization techniques (e.g., weight decays, dropouts, etc.) to improve the generalization capability of the models being trained.

In particular, the model trainer 160 can train machine-learned feature extraction model 140 based on a set of training data 162. The training data 162 can include ground-truth data used to train machine-learned feature extraction model 140 using novel loss functions. More particularly, training computing system 150 can train machine-learned feature extraction model 140 using training data 162 that includes a number of sets of ground-truth data. In one implementation, the training data 162 includes a first portion of training data corresponding to a plurality of training images and a second portion of training data corresponding to image-level labels/annotations associated with the plurality of training images.

Model trainer 160 can train the machine-learned feature extraction model 140 using one or more loss functions that describe a difference between annotated labels associated with a set of ground-truth data and output data received from the machine-learned feature extraction model 140. In particular, in some implementations, such loss function(s) can be backpropagated through the machine-learned feature extraction model 140 while modifying the machine-learned feature extraction model 140 (e.g., by modifying at least one weight of the machine-learned feature extraction model 140).

The network 180 can be any type of communications network, such as a local area network (e.g., intranet), wide area network (e.g., Internet), or some combination thereof and can include any number of wired or wireless links. In general, communication over the network 166 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2A depicts an example of the computing system 102 generating image data, according to example aspects of the present disclosure. A light source 202 can illuminate a scene 204, with a plurality of light waves. The computing system 102 can control a polarizing filter 206 to receive a light wave 210 that is from the scene 204, and generate polarized light corresponding to a polarization angle $\varphi_{pol}$. The computing system 102 can control the polarizing filter 206 to provide the polarized light to an image capture device 208 (e.g., CMOS image sensor, camera, etc.). The image capture device 208 can translate the polarized light into pixel information to generate image data 218 that represents the scene 204. The image data 218 can include a first image 212, second image 214, and third image 216 that correspond to the polarization angle $\varphi_{pol}$ being set at a first polarization angle $\varphi_1$, second polarization angle $\varphi_2$, and third polarization angle $\varphi_3$, respectively.

Figure 2B:
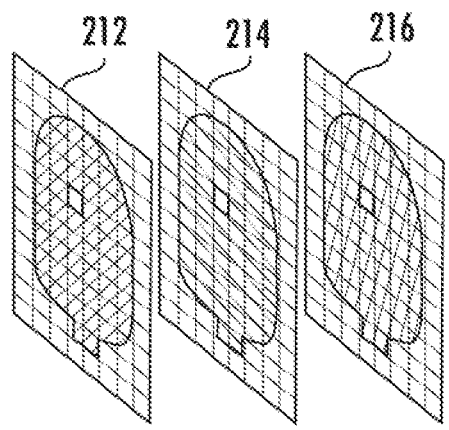
FIGS. 2B and 2C depict example image data, according to example aspects of the present disclosure.

FIG. 2B depicts example image data, according to example aspects of the present disclosure. The image data 218 can include a first image 212, a second image 214, and a third image 216. Each pixel of the first, second, and third images 212, 214, and 216 is shaded according to an intensity of captured light corresponding to that pixel. For example, a pixel having a lighter shade can indicate a greater intensity of light and a pixel having a darker shade can indicate a lesser intensity of light.

Figure 2C:
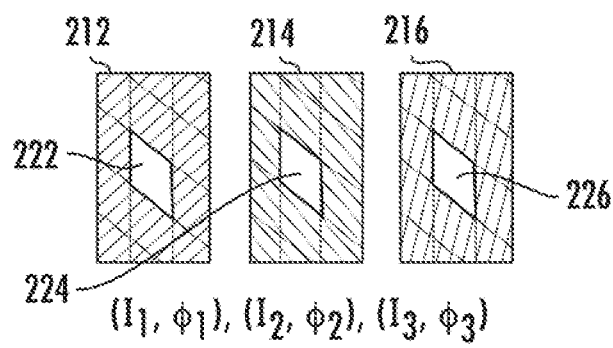

FIG. 2C depicts example image data, according to example embodiments of the present disclosure. Pixel 222 in image 212 corresponds to polarizing angle $\varphi_1$ and an intensity $I_1$, pixel 224 in image 214 corresponds to polarizing angle $\varphi_2$ and an intensity $I_2$, and pixel 226 in image 216 corresponds to polarizing angle $\varphi_3$ and an intensity $I_3$.

Figure 2D:
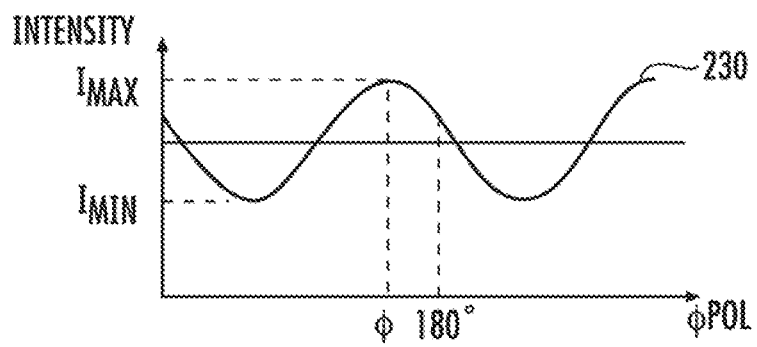
FIG. 2D depicts an example Transmitted Radiance Sinusoid curve, according to example aspects of the present disclosure.

FIG. 2D depicts an example Transmitted Radiance Sinusoid curve that fits the image data 218. The computing system 102 can determine the Transmitted Radiance Sinusoid curve based on the data points $(I_1, \varphi_1)$, $(I_2, \varphi_2)$, $(I_3, \varphi_3)$, and determine a maximum intensity value $I_{max}$ and a minimum intensity value $I_{min}$ for the image data 218, based on the Transmitted Radiance Sinusoid curve.

FIG. 3 depicts example attribute information of a scene, according to example aspects of the present disclosure. The attribute information corresponding to scene 304 can include one or more surface normals 306. The one or more surface normals 306 can each include an azimuth angle component $\varphi$ and a zenith angle component $\theta$, with respect to the sensor plane 308. The azimuth angle component $\varphi$ of the one or more surface normals 306 can indicate a rotation of the surface normal with respect to the x-axis, and the zenith angle component θ of the one or more surface normals 306 can indicate a rotation of the surface normal with respect to the z-axis.

Figure 4:
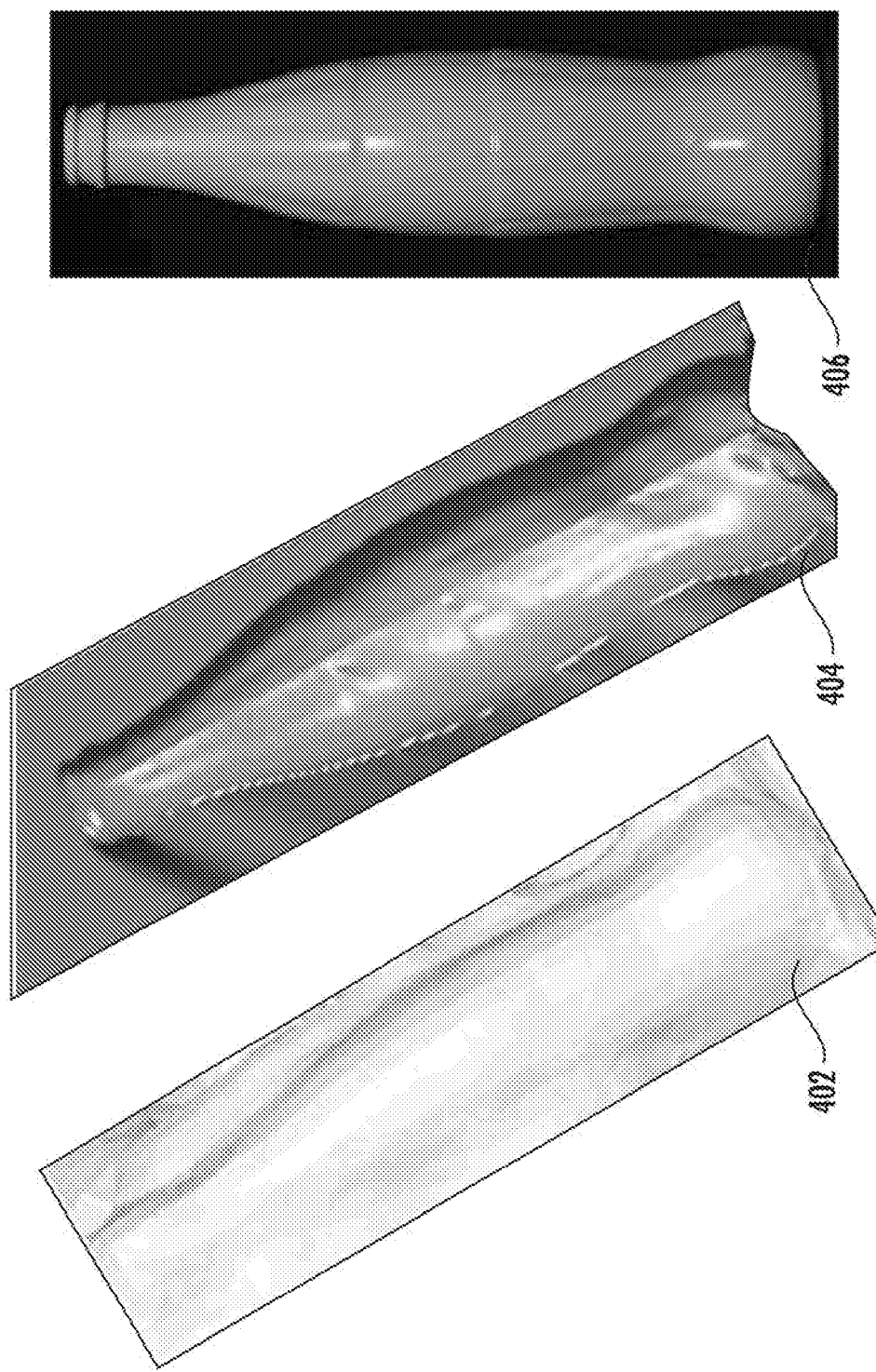
FIG. 4 depicts an example of extracting an enhanced 3D depth map of a scene, according to example aspects of the present disclosure.

FIG. 4 depicts an example of extracting an enhanced 3D depth map of a scene, according to example aspects of the present disclosure. The computing system 102 can obtain a coarse depth map 402 of a scene (e.g., by obtaining and processing sparse point cloud data representing the scene). The computing system can process the 2D polarization image 406 to determine polarization cues (e.g., attribute information) corresponding to one or more pixels of the image 406, and combine the attribute information with the coarse depth map 402 to determine enhanced depth information and generate the enhanced 3D image 404.

Figure 5:
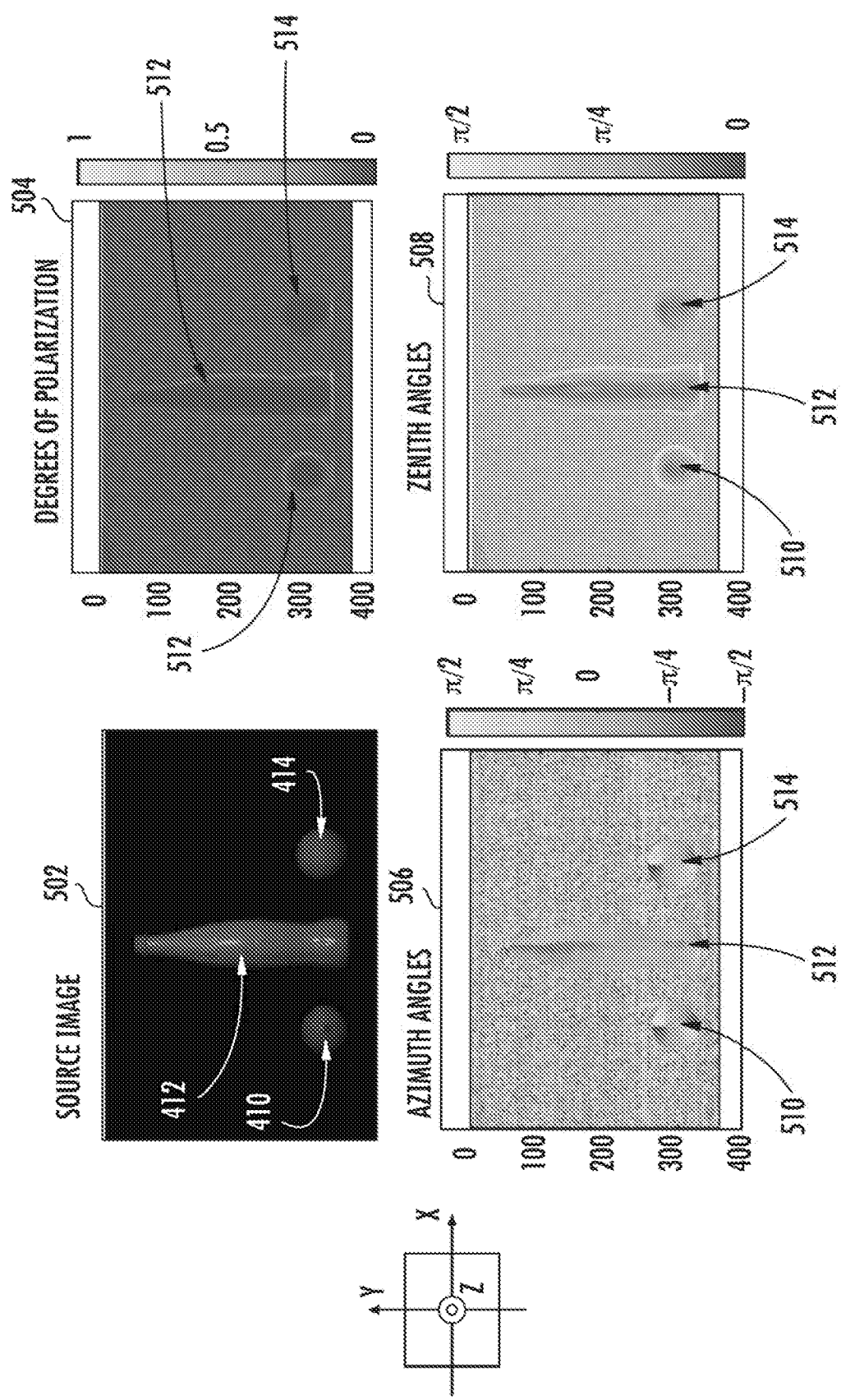
FIG. 5 depicts an example of extracting segmentation information of a scene, according to example aspects of the present disclosure.

FIG. 5 depicts an example of extracting segmentation information of a scene, according to example aspects of the present disclosure. The computing system 102 can determine a degree of polarization 504, azimuth angle 506, and zenith angle 508, for each pixel in image data 502. By comparing attribute information for a pixel with corresponding attribute information for one or more other pixels in the image data 502, the computing system 102 can identify a boundary or edge corresponding to the objects 510, 512, and 514 in the scene. The computing system 102 can extract features in the image data based on the identified boundary or edge. For example, the computing system 102 can extract features indicative of a position and depth of the objects 510, 512, and 514 in the scene to aid in segmentation of the objects 510, 512, and 514 from each other.

Figure 6:
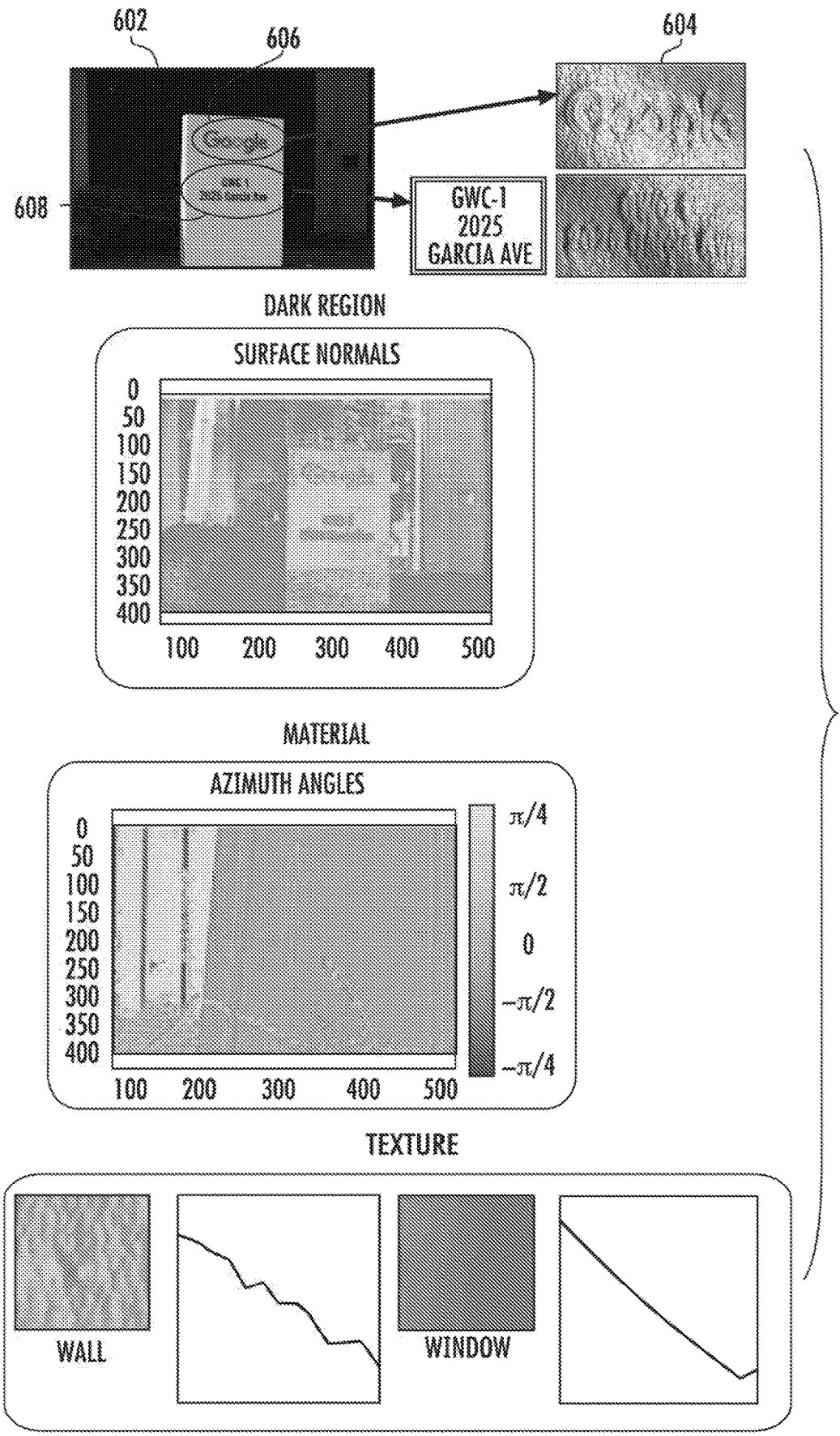
FIG. 6 depicts an example of extracting segmentation information of a scene, according to example aspects of the present disclosure.

FIG. 6 depicts an example of extracting segmentation information of a scene, according to example aspects of the present disclosure. The computing system 102 can determine attribute information 604 for image data 602. By analyzing the attribute information 604, the computing system 102 can identify a boundary or edge corresponding to the objects 606 and 608. The computing system 102 can extract features in the image data based on the identified boundary or edge. For example, the computing system 102 can extract features indicative of text associated with the objects 606 and 608 to aid in segmentation of the objects 606 and 608 from a background of the objects 606 and 608.

Figure 7A:
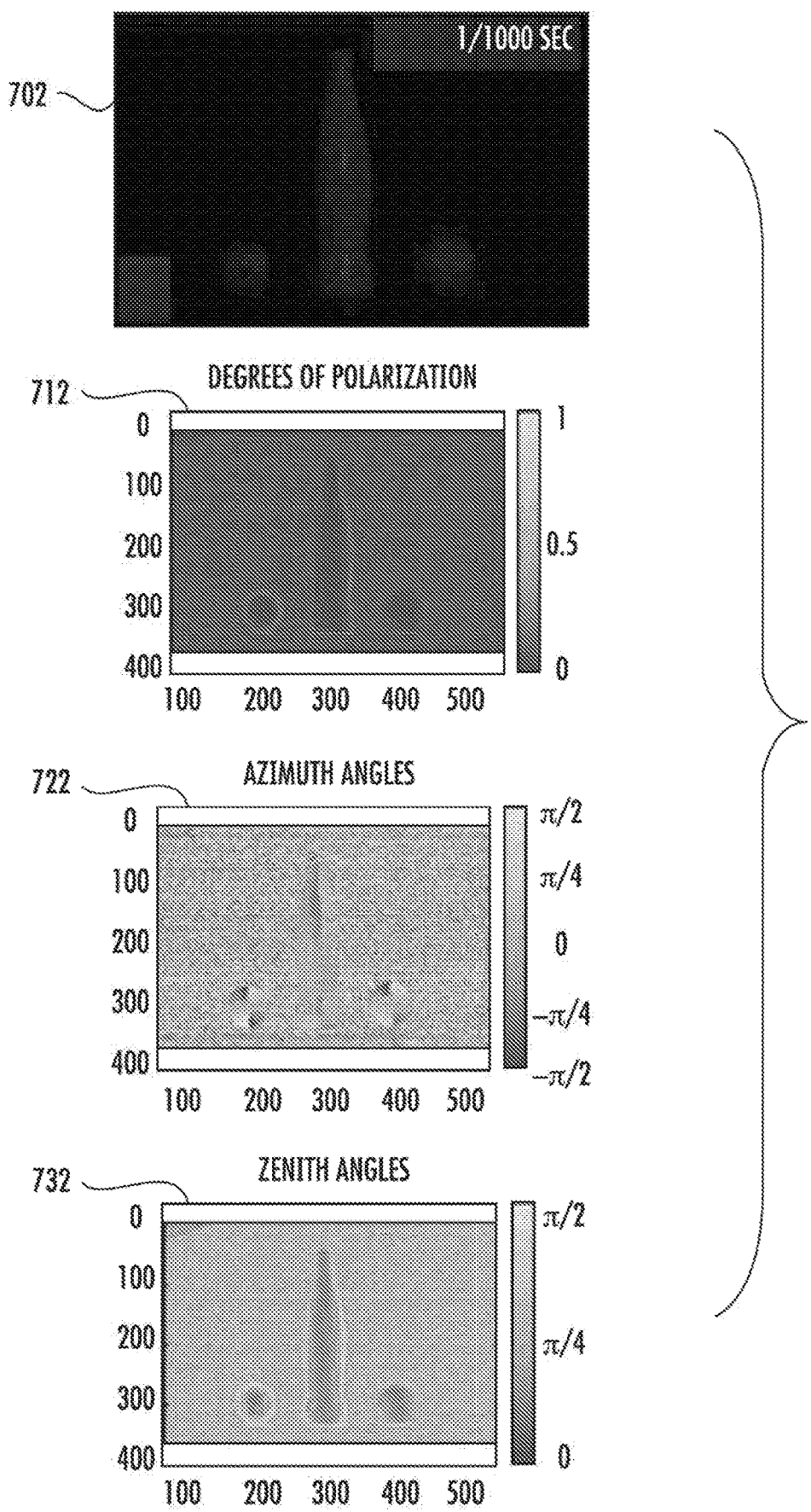
FIGS. 7A-7C depict examples of extracting one or more features from an obfuscated region in image data, according to example aspects of the present disclosure.
Figure 7B:
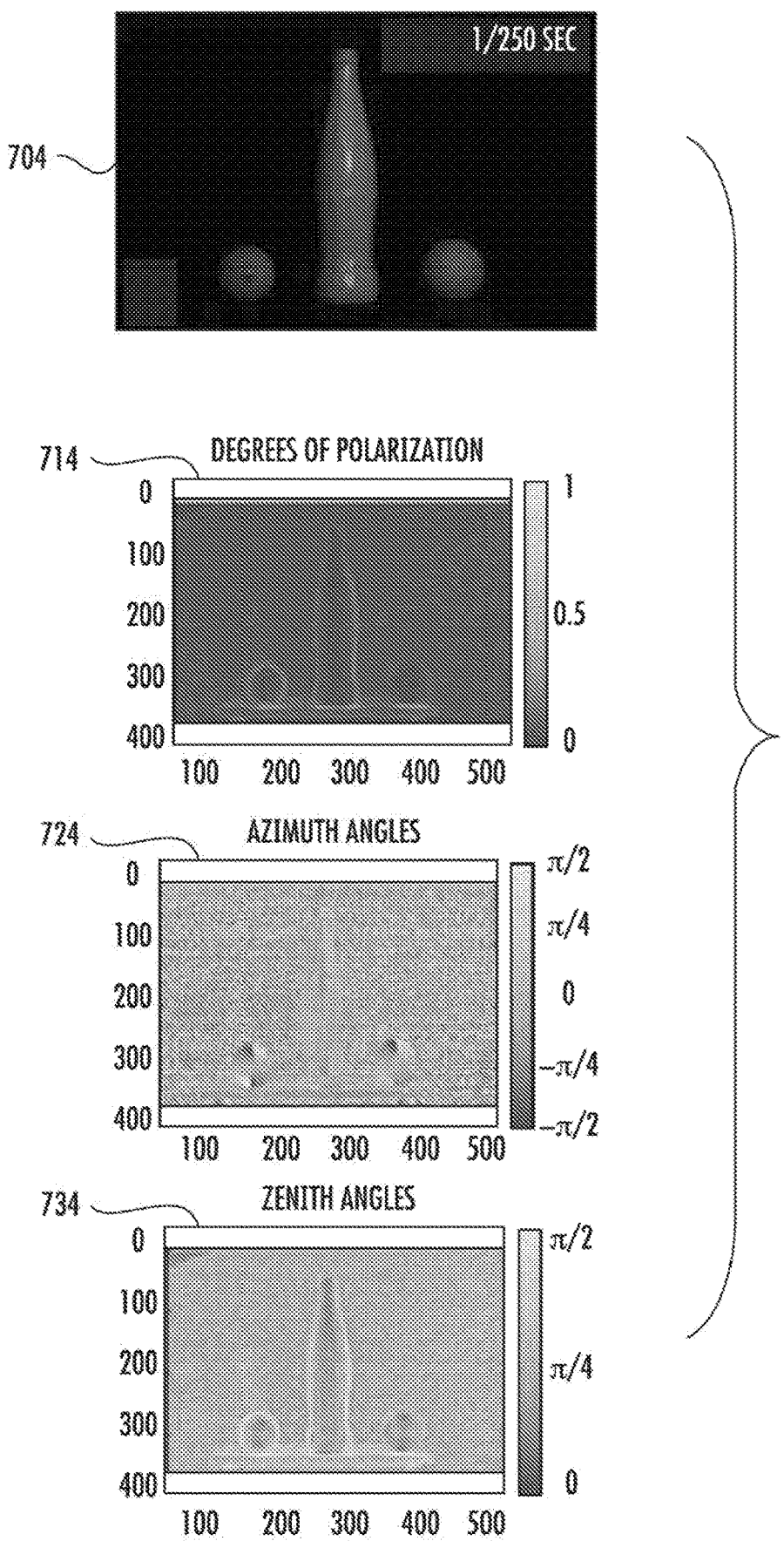
Figure 7C:
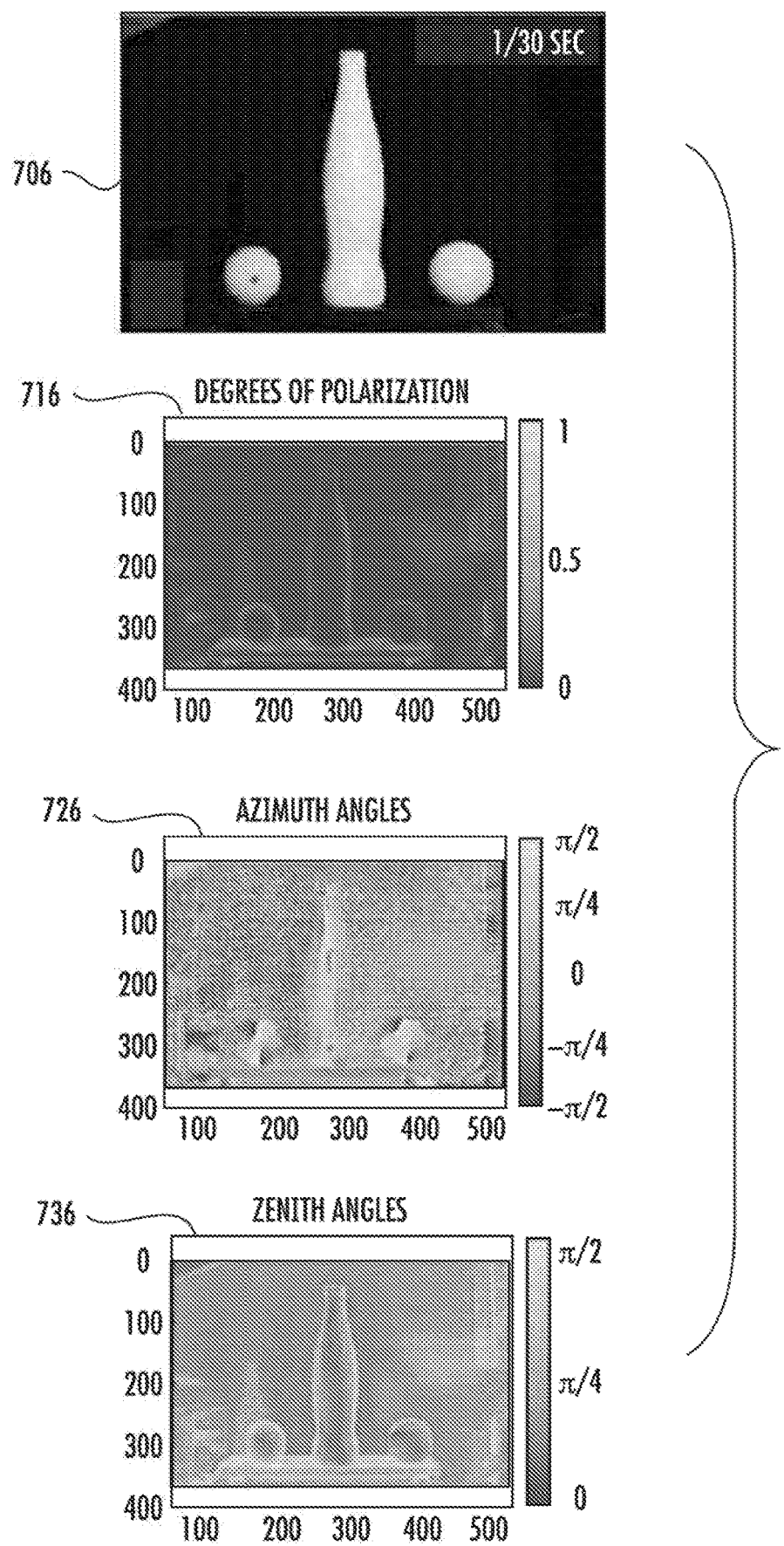

FIG. 7A-7C depict examples of extracting one or more features from an obfuscated region in image data, according to example aspects of the present disclosure. Image 702 corresponds to image data generated using a camera with a shutter speed set to $\frac{1}{1000}$ seconds, an image 704 corresponds to image data generated using a camera with a shutter speed set to $\frac{1}{250}$ seconds, and an image 706 corresponds to image data generated using a camera with a shutter speed set to $\frac{1}{30}$ seconds. When the shutter speed is faster (e.g., image 702), a shutter of a camera is opened for a shorter duration to collect light from the scene, and the camera receives less light with which to capture an image of the scene. When the shutter speed is slower (e.g., image 706), a shutter of a camera is opened for a longer duration to collect light from the scene, and the camera receives more light with which to capture an image of the scene. Accordingly, image 702 appears dimmer than image 704, and image 704 appears dimmer than image 706.

Images 712, 714, and 716 represent a degree of polarization determined for each pixel of the images 702, 704, and 706, respectively; images 722, 724, and 726 represent an azimuth angle determined for each pixel of the images 702, 704, and 706, respectively; and images 732, 734, and 736 represent a zenith angle determined for each pixel of the images 702, 704, and 706, respectively. Despite a sharp decrease in image intensity as the shutter speed is increased (from $\frac{1}{30}$ seconds in image 706 to $\frac{1}{250}$ seconds in image 704, and from $\frac{1}{250}$ seconds in image 704 to $\frac{1}{1000}$ seconds in image 702), the computing system 102 can identify a boundary or edge in the image with relative consistency by using attribute information. In this way, the computing system 102 can improve feature extraction by revealing one or more obfuscated regions in image data.

FIG. 8 depicts an example of extracting one or more features from an obfuscated region in image data, according to example aspects of the present disclosure. Image data 802 includes a sign 806 surrounded by an obfuscated region 808. The computing system 82 can process the image data 802 to determine surface normal information and generate image 804. The computing system 82 can improve feature extraction by using image 804 to reveal and extract one or more features from the obfuscated region 808.

Figure 9:
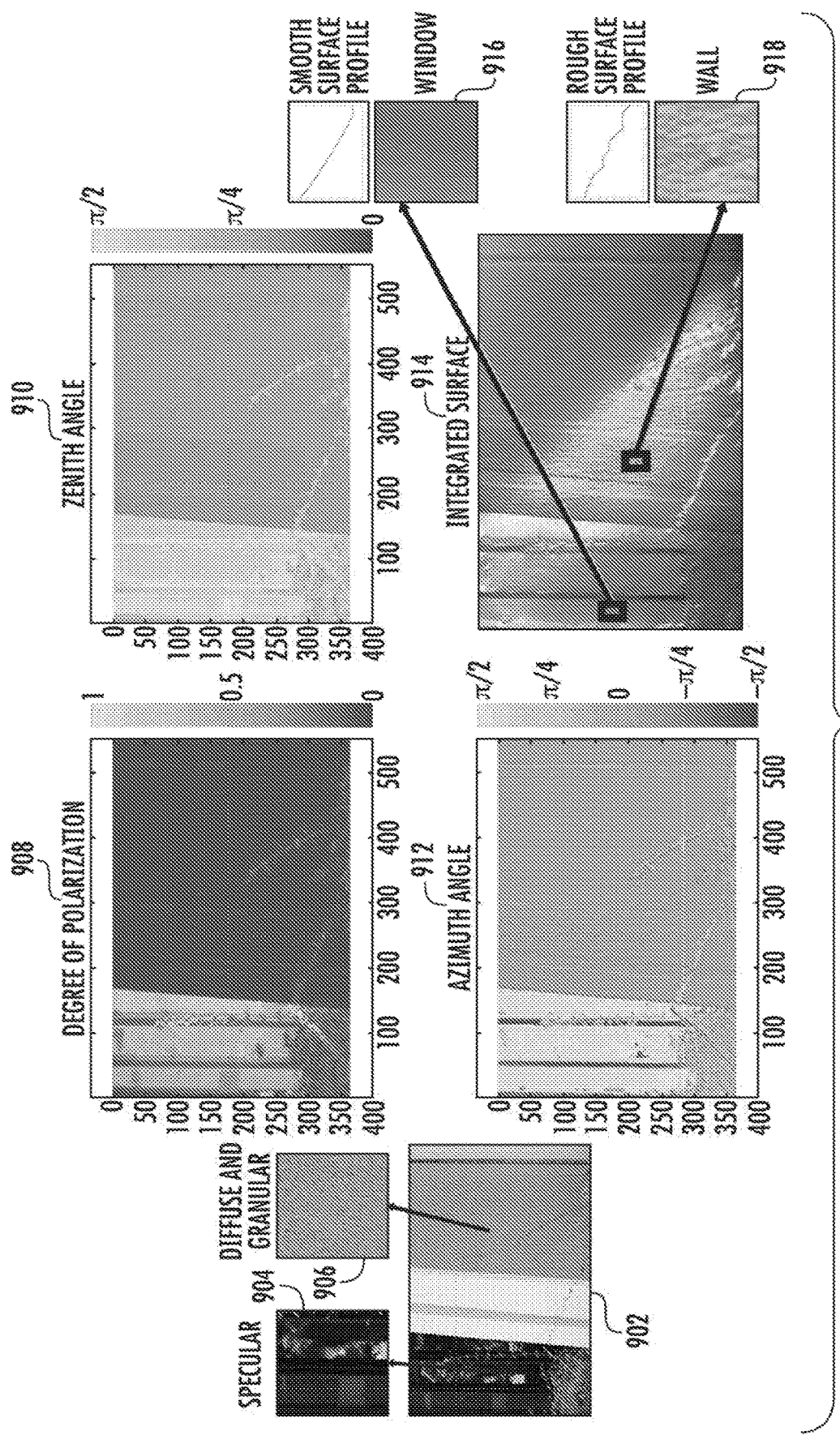
FIG. 9 depicts an example of extracting one or more features indicative of a material or texture in image data, according to example aspects of the present disclosure.

FIG. 9 depicts an example of extracting one or more features indicative of a material or texture in image data, according to example aspects of the present disclosure. Image data 902 can represent a scene that includes a first region 904 exhibiting specular reflection, and a second region 906 exhibiting diffuse and granular reflection. The computing system 102 can determine a degree of polarization 908 for each pixel in the image data 902, a zenith angle of a surface normal 910 for each pixel in the image data 902, an azimuth angle of a surface normal 912 for each pixel in the image data 902, and integrated surface data 914 for each pixel in the image data 902. The computing system 102 can analyze a slope of the integrated surface data 914 corresponding to a particular region of the scene to determine a texture property of the particular region. For example, the computing system 102 can determine that the region 916 has a smooth surface profile, and that a material occupying the region 916 is a window. Similarly, the computing system 102 can determine that the region 918 has a rough surface profile, and that a material occupying the region 918 is a wall.

Figure 10:
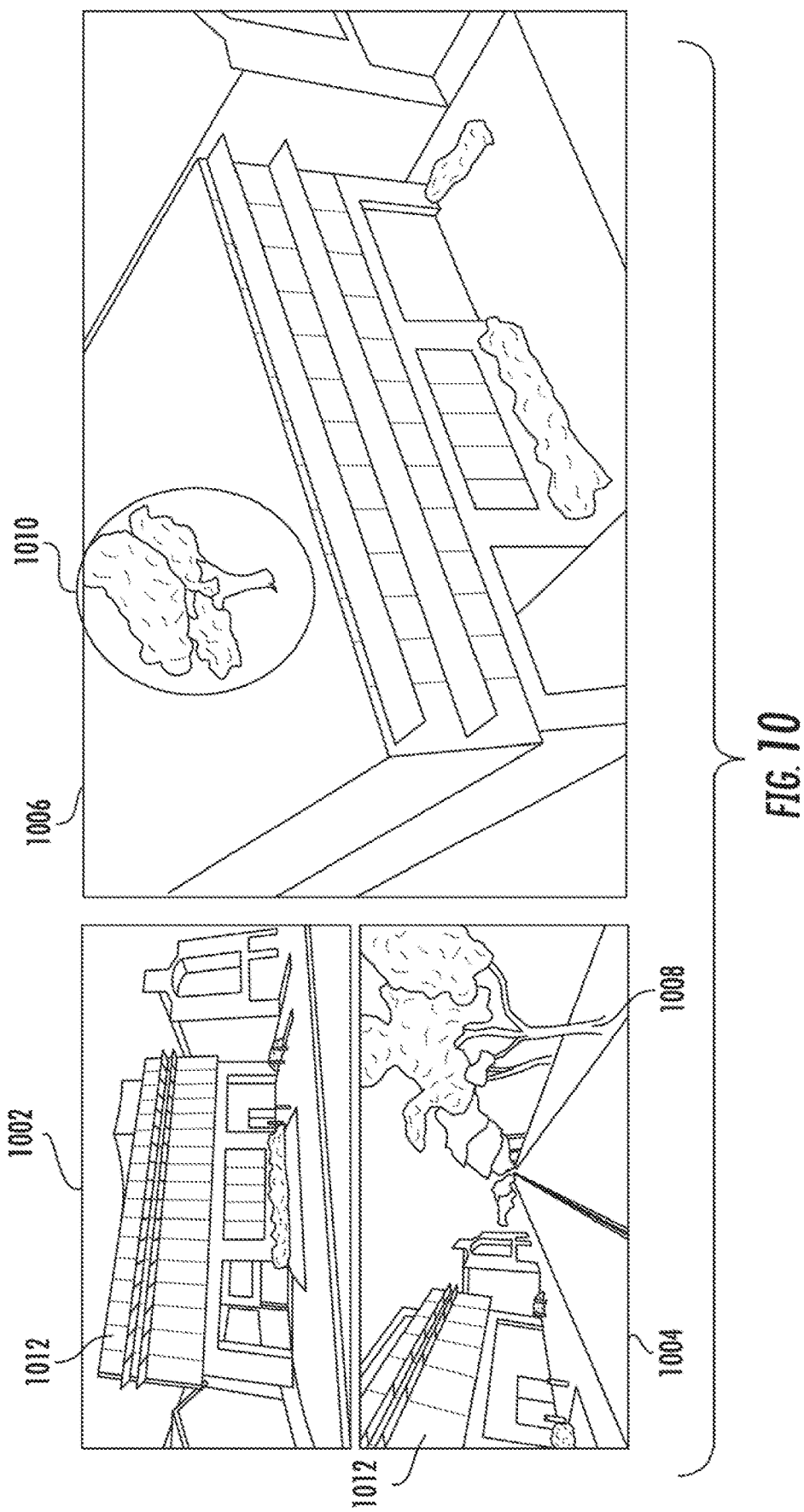
FIG. 10 depicts an example of extracting enhanced depth information in image data, according to example aspects of the present disclosure.

FIG. 10 depicts an example of extracting enhanced depth information in image data, according to example aspects of the present disclosure. Image data 1002 can represent a first scene that includes a large glass window 1012, and image data 1004 can represent a second scene that includes the large glass window 1012 and a tree 1008. When the image data 1002 is generated, a reflection of the tree 1008 appears in the large glass window 1012. Subsequently, when the computing system 102 extracts depth information 1006 from the image data 1002, the tree 1008 appears as an object 1010 positioned behind the large glass window 1012. The computing system can identify a material and/or texture of the large glass window 1012, and extract enhanced depth information indicating that the tree 1008 is positioned in front of the large glass window 1012.

Figure 11:
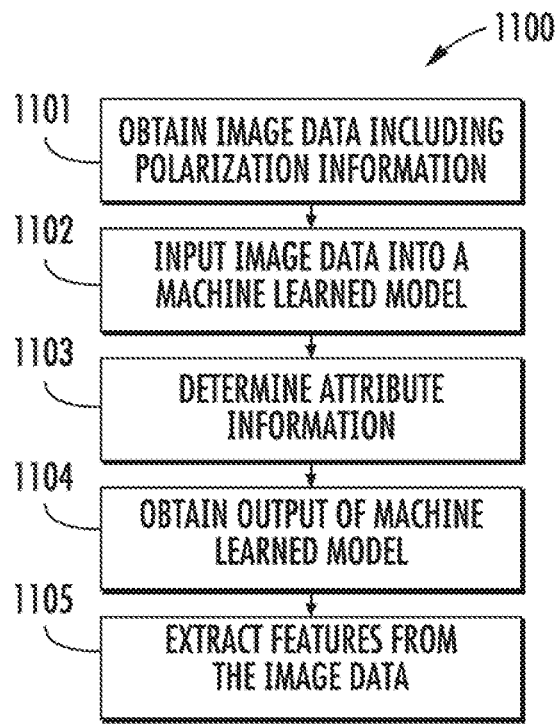
FIG. 11 depicts a flow diagram of an example method of extracting a feature in an image, according to example aspects of the present disclosure.
Figure 12:
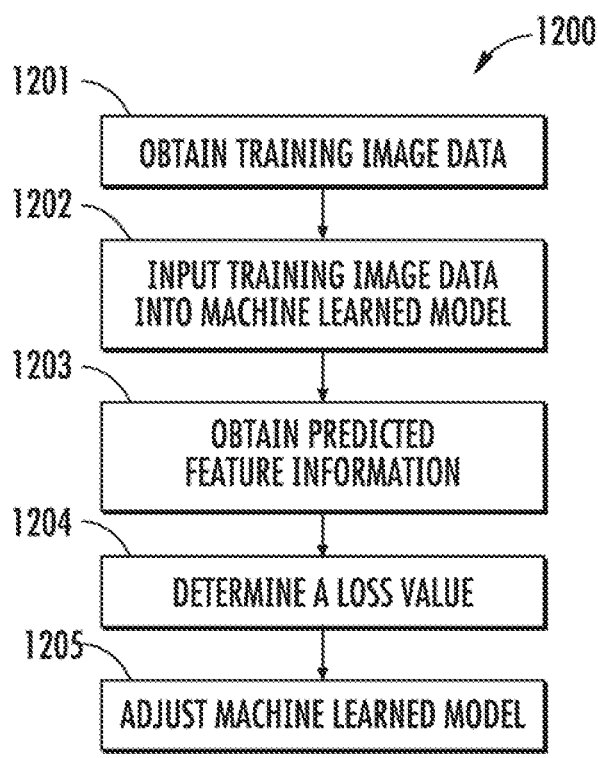
FIG. 12 depicts a flow diagram of an example method of extracting features, according to example aspects of the present disclosure.

FIGS. 11 and 12, respectively, set forth aspects associated with one or more computer-implemented methods according to example embodiments of the present disclosure. In some embodiments, the computer-implemented methods of FIGS. 11 and 12 can include other features or steps disclosed herein. In some embodiments, a computing device, computing system, or other example system or device as described with reference to FIGS. 1-11 or other example systems or devices can implement some or all of the methods depicted in FIGS. 11 and 12. In some embodiments, one or more tangible, non-transitory computer-readable media storing computer-readable instructions that when executed by one or more processors cause the one or more processors to perform operations, the operations comprising steps as set forth in one or more of the methods depicted in FIGS. 11 and 12.

FIG. 11 depicts a flow diagram of an example method 1100 of extracting a feature in an image, according to example aspects of the present disclosure.

At (1101), the method 1100 can include obtaining image data including polarization information. For example, the computing system 102 can obtain image data representing a scene. The image data can include at least a first, second, and third image corresponding to a first, second, and third polarizing angle, respectively. The first, second, and third polarizing angles can each be offset with respect to a horizontal axis of the scene by a different amount.

At (1102), the method 1100 can include inputting the image data into a machine learned feature extraction model. For example, the computing system 102 can input the image data into a machine learned model. The computing system 102 can obtain the image data by generating the first image based at least in part on light from the scene and polarized at the first polarizing angle, generating the second image based at least in part on light from the scene and polarized at the second polarizing angle, and generating the third image based at least in part on light from the scene and polarized at the third polarizing angle.

At (1103), the method 1100 can include determining attribute information for the image data. For example, the computing system 102 can determine attribute information of one or more pixels in the image data, based at least in part on the first, second, and third images corresponding to the first, second, and third polarizing angles, respectively. The computing system 102 can determine the attribute information by determining a degree of polarization for a pixel based at least in part on an intensity of the pixel in the third image, an intensity of the pixel in the second image, and an intensity of the pixel in the third image, determining a zenith angle of a surface normal at the pixel based at least in part on the degree of polarization, and determining an azimuth angle of s surface normal at the pixel based at least in part on an intensity of the pixel in one of the first, second, or third image and a corresponding polarizing angle.

At (1104), the method 1100 can include obtaining an out of the machine learned feature extraction model. For example, the computing system 102 can obtain, in response to inputting the image data into the machine learned feature extraction model, an output of the machine learned feature extraction model that includes a prediction of one or more objects of interest in the scene. The computing system 102 can analyze the attribute information to generate the prediction of one or more objects of interest in the scene.

At (1106), the method 1100 can include extracting one or more features in the image data. For example, the computing system 102 can extract one or more features indicative of an obfuscated region in the image data, enhanced depth information for one or more objects in the scene, an identification of one or more materials or textures in the scene, and enhanced depth information for one or more objects in the scene based at least in part on the identification of one or more materials or textures in the scene.

FIG. 12 depicts a flow diagram of an example method 1200 of extracting features, according to example aspects of the present disclosure.

At (1201), the method 1200 can include obtaining training image data. For example, the computing system 102 can obtain a plurality of training images having known features. Each of the plurality of training images represent a respective scene, and each of the plurality of training images can include at least a first, second, and third image of the respective scene.

At (1202), the method 1200 can include inputting training image data into a machine learned model. For example, the computing system 102 can input each of the plurality of training images into a machine learned model.

At (1203), the method 1200 can include obtaining predicted feature information. For example, the computing system 102 can obtaining, in response to inputting the plurality of training images, an output of the machine learned model that includes predicted features for each of the plurality of training images.

At (1204), the method 1200 can include determining a loss value. For example, the computing system 102 can determine a loss value that describes a difference between the respective predicted features and the respective known features for each of the plurality of training images.

At (1205), the method 1200 can include adjusting the machine learned model. For example, the computing system 102 can adjust one or more parameters of the machine learned model to reduce the loss value.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 11 and 12 depict steps performed in a particular order for purposes of illustration and discussion, the methods of the present disclosure are not limited to the particularly illustrated order or arrangement. The various steps of the methods 1100 and 1200 can be omitted, rearranged, combined, and/or adapted in various ways without deviating from the scope of the present disclosure.

What is claimed is:

1. A computer-implemented method to extract a feature in an image, the method comprising:
obtaining with an image capture system, by one or more computing devices, image data representing a scene, the image capture system comprising two or more cameras and one or more splitters, each camera having a polarizing filter at a respective polarizing angle, the one or more splitters being configured to split light from the scene to provide light to each polarizing filter, the image capture system configured to simultaneously generate two or more polarized images of the scene, wherein the image data includes the two or more polarized images of the scene, each image associated with a different polarization angle;

determining, by the one or more computing devices, attribute information based at least in part on the image data; and determining, by the one or more computing devices, one or more features in the image data based at least in part on the attribute information.

2. The computer-implemented method of claim 1, wherein determining, by the one or more computing devices, one or more features in the image data based at least in part on the attribute information comprises:

inputting, by the one or more computing devices, the attribute information into a machine learned model; and obtaining, by the one or more computing devices, in response to inputting the attribute information into the machine learned model, an output of the machine learned model that includes a prediction of one or more objects of interest in the scene.

3. The computer-implemented method of claim 1, wherein determining attribute information based at least in part on the image data comprises:

determining, by the one or more computing devices, a degree of polarization for a pixel based at least in part on an intensity of the pixel in the two or more polarized images; and/or determining, by the one or more computing devices, a zenith angle of a surface normal at the pixel based at least in part on the degree of polarization; and/or determining, by the one or more computing devices, an azimuth angle of a surface normal at the pixel based at least in part on an intensity of the pixel in one of the two or more polarized images and a corresponding polarizing angle.

4. The computer-implemented method of claim 1, wherein determining, by the one or more computing devices, one or more features in the image data based at least in part on the attribute information comprises:

determining, by the one or more computing devices, one or more features corresponding to an obfuscated region in the image data.

5. The computer-implemented method of claim 1, wherein determining, by the one or more computing devices, one or more features in the image data based at least in part on the attribute information comprises:

determining, by the one or more computing devices, enhanced depth information for one or more objects in the scene.

6. The computer-implemented method of claim 1, wherein determining, by the one or more computing devices, one or more features in the image data based at least in part on the attribute information comprises:

determining, by the one or more computing devices, an identification of one or more materials or textures in the scene; and determining, by the one or more computing devices, enhanced depth information for one or more objects in the scene based at least in part on the identification of one or more materials or textures in the scene.

7. The computer-implemented method of claim 1, wherein the polarizing angles are each offset with respect to a horizontal axis of the scene by a different amount.

8. A computer system to extract a feature in an image, the computer system comprising one or more computing devices that store instructions to perform operations, the operations comprising:

obtaining with an image capture system, by one or more computing devices, image data representing a scene, the image capture system comprising two or more cameras and one or more splitters, each camera having a polarizing filter at a respective polarizing angle, the one or more splitters being configured to split light from the scene to provide light to each polarizing filter, the image capture system configured to simultaneously generate two or more polarized images of the scene, wherein the image data includes the two or more polarized images of the scene, each image associated with a different polarization angle;

determining, by the one or more computing devices, attribute information based at least in part on the image data; and determining, by the one or more computing devices, one or more features in the image data based at least in part on the attribute information.

9. The computer system of claim 8, wherein determining, by the one or more computing devices, one or more features in the image data based at least in part on the attribute information comprises:

inputting, by the one or more computing devices, the attribute information into a machine learned model; and obtaining, by the one or more computing devices, in response to inputting the attribute information into the machine learned model, an output of the machine learned model that includes a prediction of one or more objects of interest in the scene.

10. The computer system of claim 8, wherein determining attribute information based at least in part on the image data comprises:

determining, by the one or more computing devices, a degree of polarization for a pixel based at least in part on an intensity of the pixel in the two or more polarized images; and/or determining, by the one or more computing devices, a zenith angle of a surface normal at the pixel based at least in part on the degree of polarization; and/or determining, by the one or more computing devices, an azimuth angle of a surface normal at the pixel based at least in part on an intensity of the pixel in one of the two or more polarized images and a corresponding polarizing angle.

11. The computer system of claim 8, wherein determining, by the one or more computing devices, one or more features in the image data based at least in part on the attribute information comprises:

determining, by the one or more computing devices, one or more features corresponding to an obfuscated region in the image data.

12. The computer system of claim 8, wherein determining, by the one or more computing devices, one or more features in the image data based at least in part on the attribute information comprises:

determining, by the one or more computing devices, enhanced depth information for one or more objects in the scene.

13. The computer system of claim 8, wherein determining, by the one or more computing devices, one or more features in the image data based at least in part on the attribute information comprises:

determining, by the one or more computing devices, an identification of one or more materials or textures in the scene; and determining, by the one or more computing devices, enhanced depth information for one or more objects in the scene based at least in part on the identification of one or more materials or textures in the scene.

\* \* \* \* \*